(12) United States Patent
Finn et al.

(10) Patent No.: US 7,713,021 B2
(45) Date of Patent: May 11, 2010

(54) FAN CONTAINMENT CASINGS AND METHODS OF MANUFACTURE

(75) Inventors: Scott Roger Finn, Niskayuna, NY (US); Craig Douglas Young, Maineville, OH (US); Peter Michael Finnigan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 683 days.

(21) Appl. No.: 11/638,053

(22) Filed: Dec. 13, 2006

(65) Prior Publication Data

US 2008/0145215 A1 Jun. 19, 2008

(51) Int. Cl.
*F01D 1/02* (2006.01)
*B23P 17/00* (2006.01)

(52) U.S. Cl. ............... 415/9; 415/170.1; 415/173.4; 415/174.4; 415/200; 29/888.024

(58) Field of Classification Search ............ 415/9, 415/200, 170.1, 173.4, 174.4; 60/226.1; 29/888.024
See application file for complete search history.

(56) References Cited

U.S. PATENT DOCUMENTS

| | | | | |
|---|---|---|---|---|
| 3,974,313 | A | * | 8/1976 | James ..................... 415/9 |
| 4,699,567 | A | * | 10/1987 | Stewart ................. 415/200 |
| 5,328,324 | A | * | 7/1994 | Dodd ....................... 415/9 |
| 5,437,538 | A | * | 8/1995 | Mitchell ................... 415/9 |
| 5,447,411 | A | * | 9/1995 | Curley et al. ............. 415/9 |
| 6,375,410 | B2 | | 4/2002 | Clouse et al. |
| 6,482,497 | B1 | | 11/2002 | Kay et al. |
| 6,889,937 | B2 | | 5/2005 | Simpson et al. |
| 7,246,990 | B2 | * | 7/2007 | Xie et al. ................. 415/9 |
| 7,503,164 | B2 | * | 3/2009 | McMillan ............. 415/173.1 |
| 2003/0175453 | A1 | | 9/2003 | Steffier |
| 2004/0146393 | A1 | | 7/2004 | Evans et al. |
| 2005/0113229 | A1 | | 5/2005 | Cairo |
| 2005/0211873 | A1 | | 9/2005 | Krishna et al. |

OTHER PUBLICATIONS

M. Xie et al., "Composite Fan Containment Case for Turbine Engines," U.S. Appl. No. 11/020,483, filed Dec. 22, 2005.

* cited by examiner

*Primary Examiner*—Igor Kershteyn
(74) *Attorney, Agent, or Firm*—Penny A. Clarke (57) ABSTRACT

A fan containment casing includes a core comprising a number of tows. The core has a central region and two end regions. The tows are grouped into a number of bands and form a number of filament-wound radially disposed layers. The bands of tows are interleaved as a number of direct bands and indirect bands along at least a portion of one or more of the layers. A method of forming a fan containment casing includes winding a number of tows on a liner to form a number of radially disposed layers, where each of the layers is continuously connected to at least one adjacent one of the layers across one of the end regions via at least one of the tows.

22 Claims, 8 Drawing Sheets

FAN CONTAINMENT CASINGS AND METHODS OF MANUFACTURE

BACKGROUND

The invention relates generally to gas turbine engines and, more particularly, to fan containment casings for gas turbine engines.

Gas turbine engines typically include high and low pressure compressors, a combustor, and at least one turbine. The compressors compress air, which is mixed with fuel and channeled to the combustor. The mixture is then ignited for generating hot combustion gases, and the combustion gases are channeled to the turbine, which extracts energy from the combustion gases for powering the compressor, as well as producing useful work to propel an aircraft in flight or to power a load, such as an electrical generator.

When engines operate in various conditions, foreign objects may be ingested into the engine. More specifically, various types of foreign objects may be entrained in the inlet of a gas turbine engine, ranging from large birds, to hailstones, sand and rain. The foreign objects may impact a blade resulting in a portion of the impacted blade being torn loose from a rotor. Such a condition, known as foreign object damage, may cause the rotor blade to pierce an engine casing resulting in cracks along an exterior surface of the engine casing. Additionally, foreign object damage may cause a portion of the engine to bulge or deflect resulting in increased stresses along the entire engine casing.

At least some known engines include a metallic casing shell to prevent foreign objects and engine fragments from escaping the engine and to increase the radial and axial stiffness of the engine. Casing shells are typically fabricated from a metallic material and are one of the heaviest components in a gas turbine engine. It is highly desirable to reduce the weight of such shells through the use of less dense materials. U.S. patent Ser. No. 11/020,483, entitled "Composite fan containment case for turbine engines," discloses a composite fan containment case that combines exceptional impact resistance and damage tolerance properties with significant weight reduction relative to metal casings. However, it would be desirable to provide a relatively low-cost, light-weight fan casing with high-impact resistance. It would further be desirable to provide a method of manufacture for the fan casing that does not require a subsequent infusion of resin. It would further be desirable for the method of manufacture to avoid a secondary bonding process.

BRIEF DESCRIPTION

One aspect of the present invention resides in a fan containment casing comprising a core that includes a number of tows. The core has a central region and two end regions. The tows are grouped into a number of bands and form a number of filament-wound radially disposed layers. The bands of tows are interleaved as a number of direct bands and indirect bands along at least a portion of one or more of the layers.

Another aspect of the invention resides in a method of forming a fan containment casing. The method includes winding a number of tows on a liner to form a number of radially disposed layers. Each of the layers is continuously connected to at least one adjacent one of the layers across one of the end regions via at least one of the tows.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
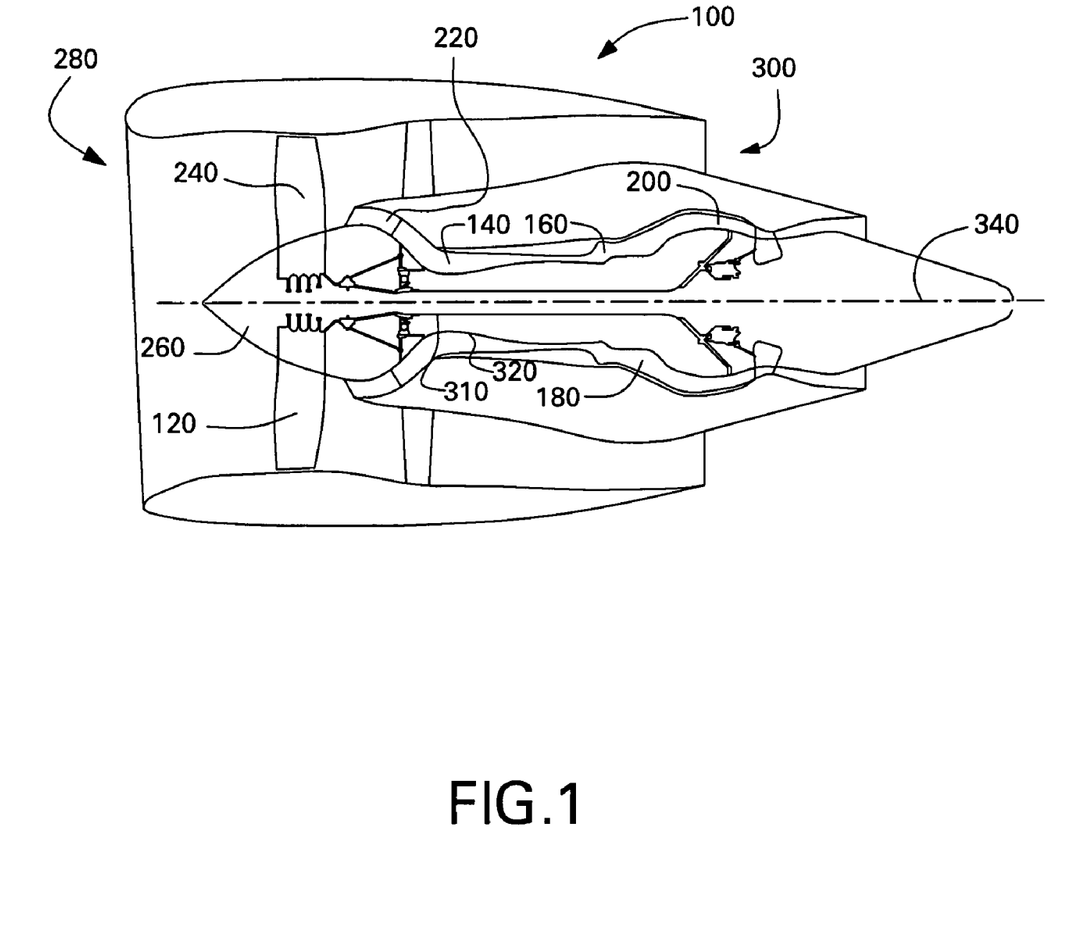
FIG. 1 schematically illustrates an example gas turbine engine.

A fan containment casing 10 for a gas turbine engine 100 is described in detail below. FIG. 1 schematically illustrates a gas turbine engine 100. The present invention is not limited to use in a specific gas turbine engine, and the engine shown in FIG. 1 is for illustrative purposes only. The gas turbine engine 100 includes a fan assembly 120 and a core engine 130 including a high-pressure compressor 140, and a combustor 160. Engine 100 also includes a high-pressure turbine 180, a low-pressure turbine 200, and a booster 220. Fan assembly 120 includes an array of fan blades 240 extending radially outward from a rotor disc 260. Engine 100 has an intake side 280 and an exhaust side 300. In one example, the gas turbine engine is a GE90 available from General Electric Company, Cincinnati, Ohio. Fan assembly 120 and turbine 200 are coupled by a first rotor shaft 310. Compressor 140 and turbine 180 are coupled by a second rotor shaft 320.

During operation, air flows through fan assembly 120, along a central axis 340, and compressed air is supplied to high-pressure compressor 140. The highly compressed air is delivered to combustor 160. Airflow (not shown in FIG. 1) from combustor 160 drives turbines 180 and 200, and turbine 200 drives fan assembly 120 by way of shaft 310.

Figure 2:
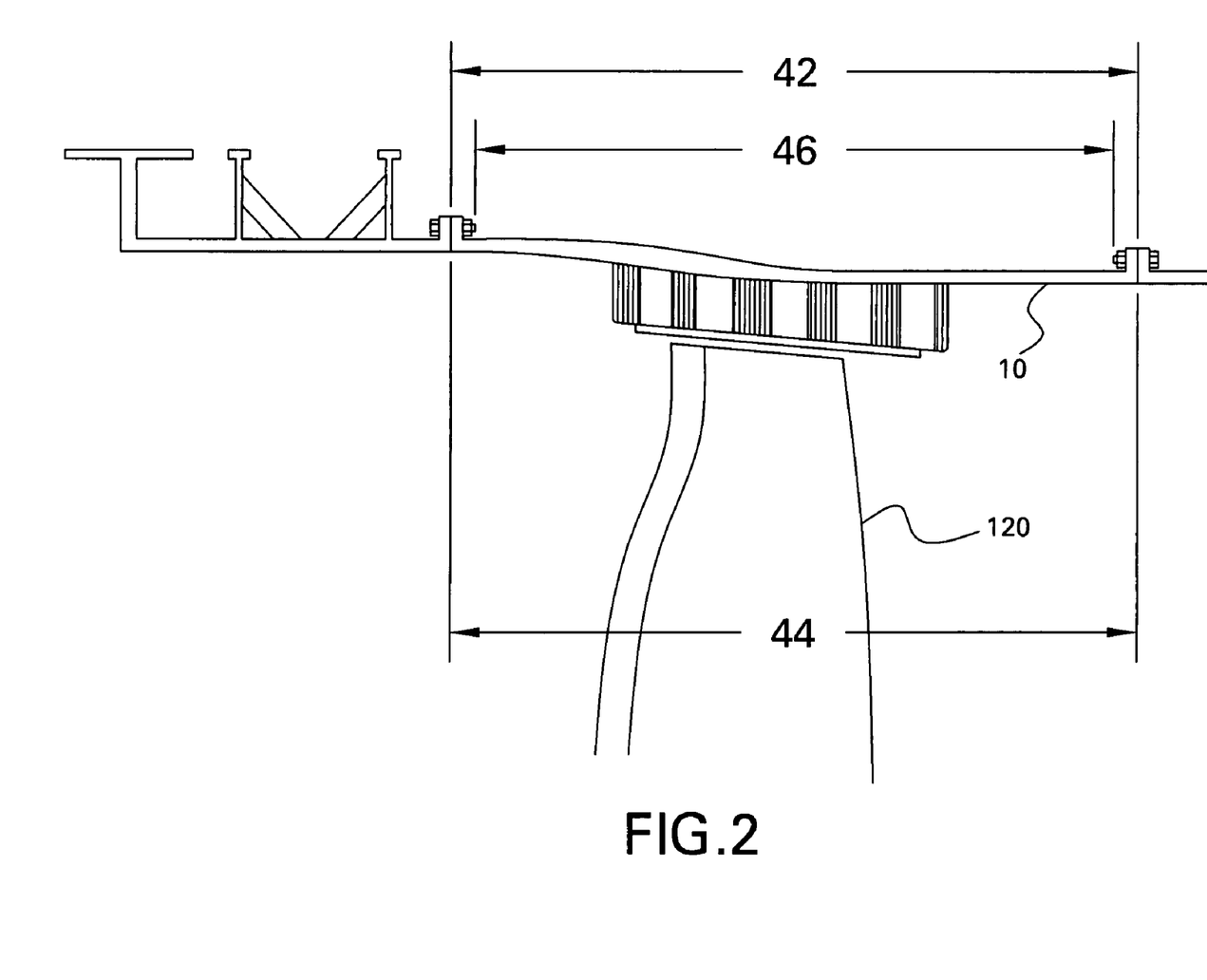
FIG. 2 schematically depicts a cross-section of an example fan containment casing.
Figure 3:
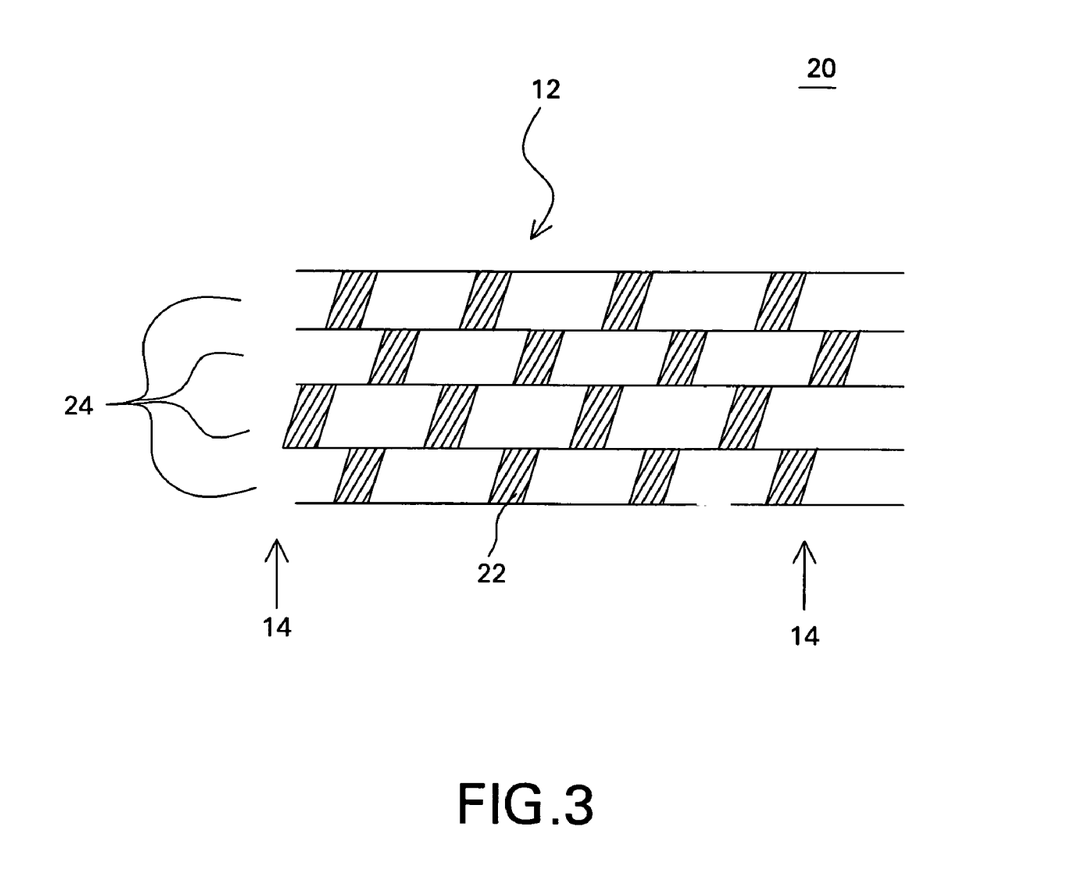
FIG. 3 schematically illustrates a cross-section of a portion of the fan containment casing shown in FIG. 2, in accordance with an exemplary embodiment of the present invention.

FIG. 2 is a schematic cross-section illustration of a fan containment casing 10, and FIG. 3 is a schematic cross-section illustration of a portion of fan containment casing 10. Referring to FIG. 2, in an exemplary embodiment, engine containment casing 10 is a hardwall containment system with a length 42 that is approximately equal to a fan assembly length 44. More specifically, length 42 is variably sized, so that fan containment case 10 circumscribes a prime containment zone 46 of fan assembly 120. Prime containment zone as used herein is defined a zone extending both axially and circumferentially around fan assembly 120 where a fan blade 240 is most likely to be ejected from fan assembly 120.

In the exemplary embodiment shown in FIG. 3, containment casing 10 includes a core 20 comprising a number of tows 22. As indicated, the core 20 has a central region 12 and two end regions 14. As shown for example in FIG. 4, the tows are grouped into a number of bands 26 and form a number of filament-wound radially disposed layers 24. Each band 26 contains one or more tows 22. As shown for example in FIG.

Figure 4:
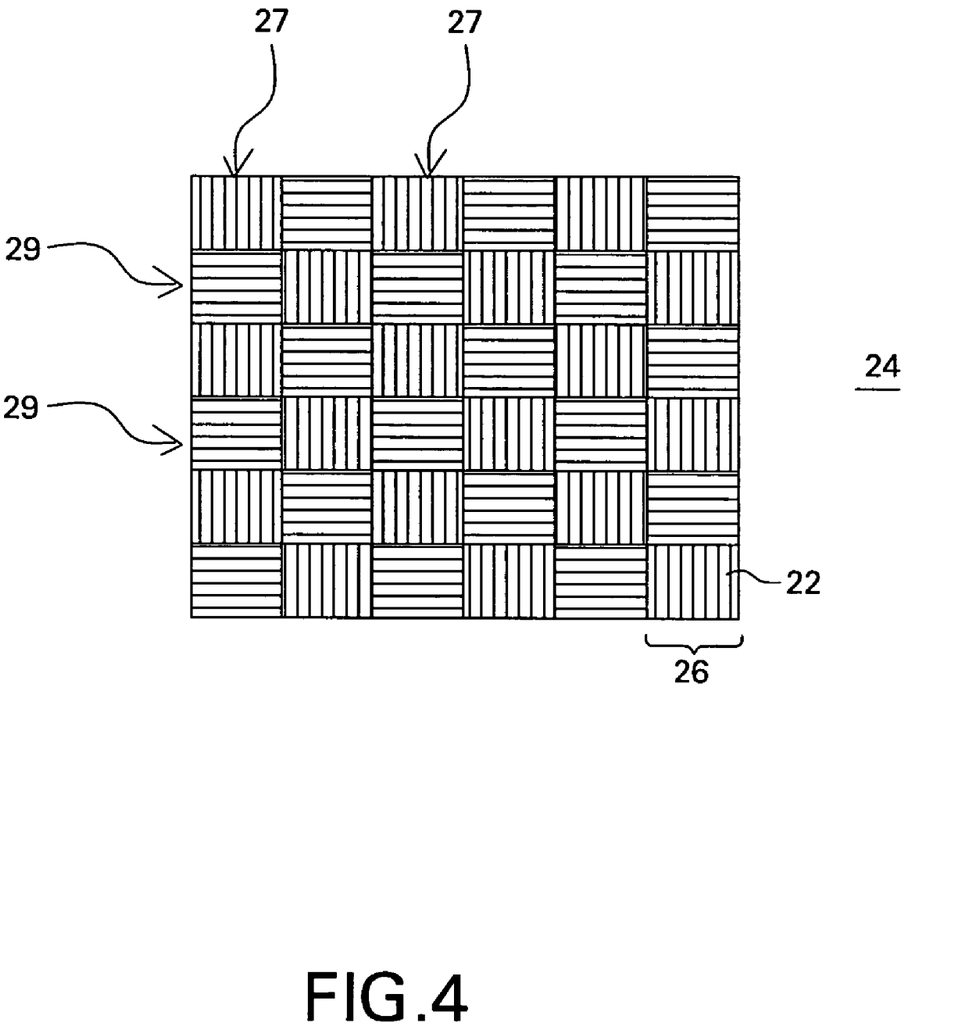
FIG. 4 schematically illustrates a layer of a filament-wound core with interleaved direct and indirect bands of tows.

4, the bands 26 are interleaved (or woven or braided) as a number of direct bands 27 and indirect bands 29 along at least a portion of one or more of the layers.

Tows 22 may be wound, wrapped or otherwise positioned in a variety of patterns. For the illustrated embodiments, the core 20 comprises a filament wound core, and the tows 22 are positioned using filament winding techniques. In particular embodiments, the tows 22 comprise fiber tows. For more particular embodiments, the fiber tows comprise about 10,000 to about 50,000 fibers per tow. Typically, the strength of core 20 is reduced when the tows contain more than 50,000 fibers, while manufacturing costs increase when the tows contain fewer than 3000 fibers.

The pattern shown in FIG. 4 is merely an example, and the direct and indirect bands need not contain the same number of tows. A variety of interleaving patterns may be employed, including patterns that mimic traditional textile patterns, non-limiting examples of which include tri-axial braid, twill weave and satin weave. Beneficially, interleaving (or weaving or braiding) the bands 26 of tows 22 enhances the containment (puncture resistance) of the core 20.

Figure 5:
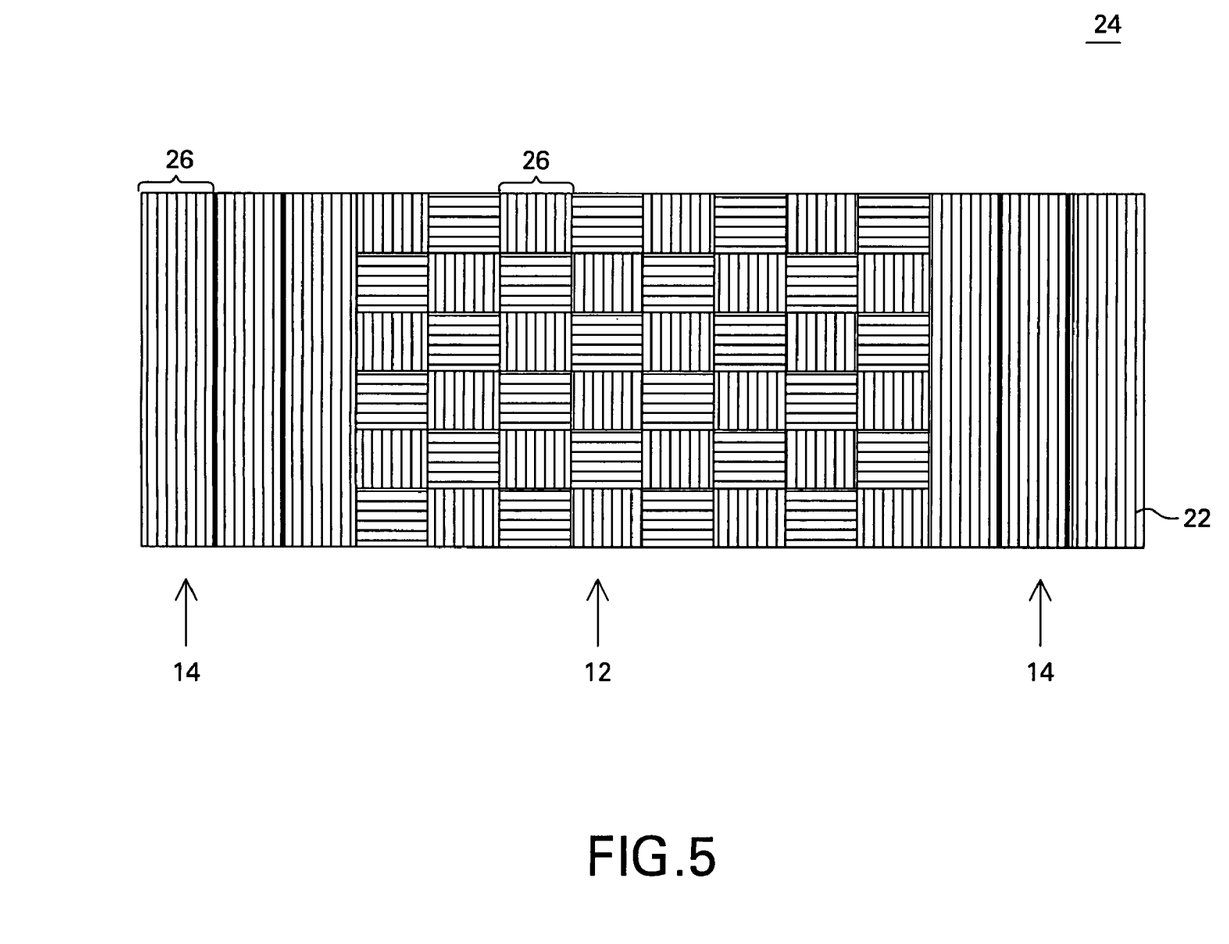
FIG. 5. schematically depicts a layer of a filament-wound core with wrapped tows in the end regions of the core and with interleaved bands of tows in a central portion of the core.

For the exemplary embodiment schematically illustrated in FIG. 5, the bands 26 of tows 22 are wrapped (or taped) along at least a portion of one or more of the layers 24. Beneficially, wrapping (or taping) the bands of tows enhances the strength of the core 20. For the example shown in FIG. 5, the bands of tows 22 are wrapped along the end regions 14 of the core 20 within at least one of the layers, and the bands of tows are interleaved in the central region 12 of the core within at least one of the layers. This arrangement provides enhanced containment in the central region of the core and enhanced strength in the end regions of the core.

In certain applications, it is desirable to use multiple fiber types to form wound core 20. Accordingly, for certain embodiments, at least one of the tows 22 comprises a first material and at least one of the tows comprises a second material. The fiber types may be mixed within a given layer 24 or different layers may be formed using different fiber types. In one example, harder, shear resistant fibers may be incorporated at the impact surface, while the fiber near the back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneema®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands. In another example, the second material comprises an electrically conductive material. For example, an electrically conductive strip can be wound into the core 20 during a filament winding process. Non-limiting examples of electrically conductive materials include metals, for example copper. Beneficially, the metal strip could provide deicing capability or lightning protection. In certain embodiments, the first material is selected from the group consisting of carbon, glass, boron, p-phenylenetherephtalamide (Kevlar®), ceramic, aromatic polyamid and silicon carbide.

For certain applications, it is desirable to form the core 20 by forming layers 24 of different fiber types. In one example, one or more layers 24 of glass fiber are formed on a surface of a number of carbon (or carbon composite) layers 24, to inhibit galvanic corrosion in neighboring aluminum components. More generally, in certain embodiments at least one of the layers 24 is formed using the tows 22 comprising the first material, and at least one other layer 24 is formed using the tows 22 comprising the second material.

In other applications, it is desirable to form mixed fiber type layers 24. Namely, at least one of the layers 24 is formed using at least one tow 22 comprising the first material and at least one tow 22 comprising the second material. More particularly, the tows 22 comprising the first and second materials may be interlaced to form the layer(s) 24. For example, glass fibers may be interlaced With carbon (graphite) fibers to enhance the puncture resistance of the core 20.

In other applications, the tows 22 comprising the first and second materials are laid down on different regions of the wound core 20. For example, a high toughness fiber (such as Kevlar or S-glass) may be laid down in the impact zones, while a high strength fiber (such as carbon fiber) is laid down in the attachment zones, within one or more layers 24.

Desirably, fan containment casing 10 is tailorable for protection against multiple size threats. For puncture resistance, the optimal unit cell size depends on the size of the penetrating object. For certain embodiments, at least one of the bands 26 of tows 22 has a first width and at least one of the bands 26 of tows 22 has a second width, where the first and the second widths are different. For example, the width of the bands 26 may vary from about 0.125 inches (0.3175 cm) to about 6 inches (15.24 cm). Smaller width bands protect against smaller projectiles, for example engine fragments, whereas larger width bands protect against larger projections, for example the leading edge of a fan blade. In addition, the tightness of the winding pattern may be adjusted, such that the unit cell size differs in different regions of the core 20.

Figure 6:
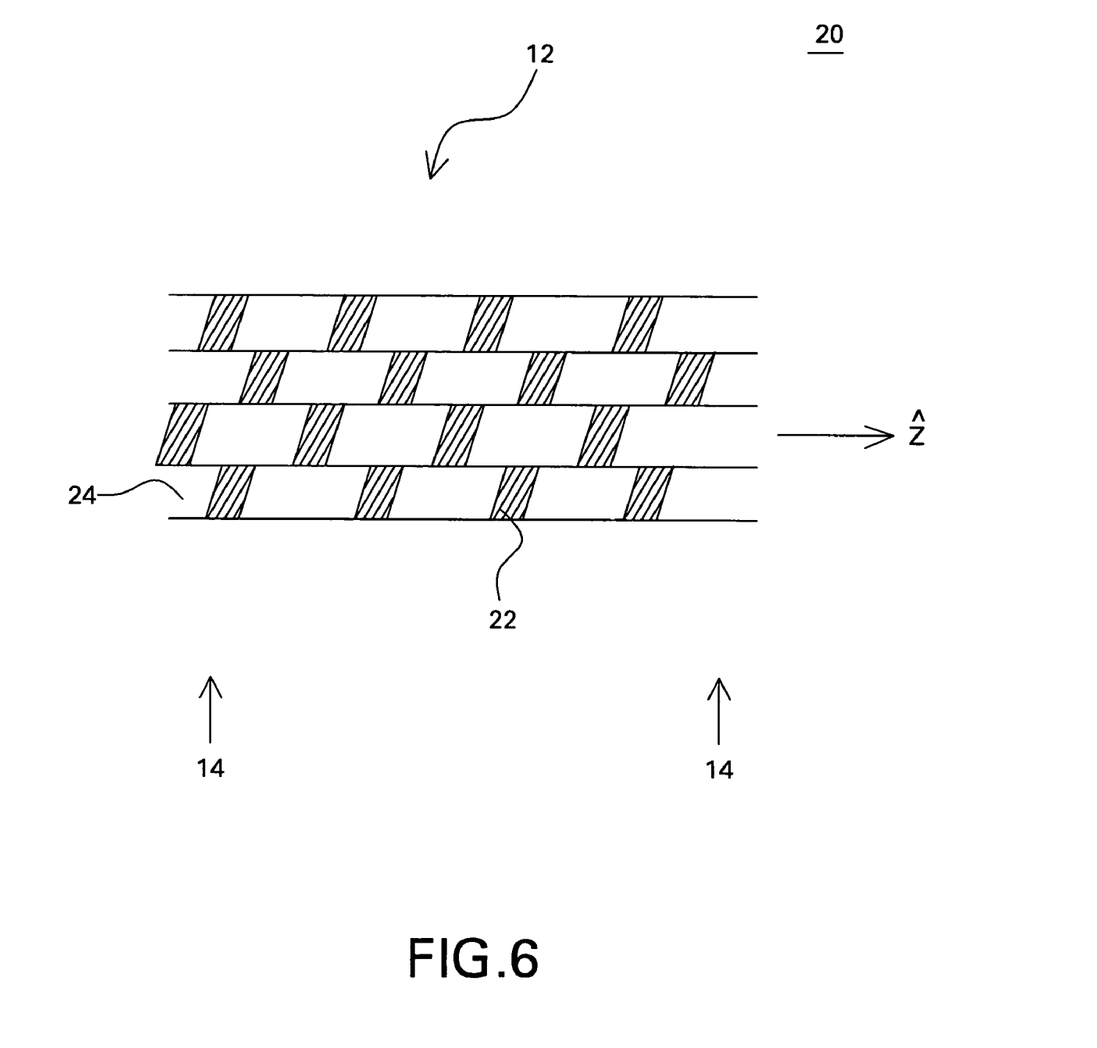
FIG. 6 schematically illustrates a cross-section of a portion of a filament-wound core with a thickness that varies a function of the spatial position along the z-axis.

FIG. 6 schematically illustrates another embodiment of fan containment casing 10. It should be noted that the configuration shown in FIG. 6 is for illustrative purposes only. For certain embodiments, the tows 22 are wound such that a thickness of the fan containment casing varies as a function of spatial position along a z-axis. This can be accomplished in several ways. For the illustrated embodiment, some of the layers do not span the length of the core, such that the core 20 is built up in certain regions. In other embodiments, the band widths, fiber angles relative to the axis of symmetry, and/or winding tightness are varied during winding (thereby changing the unit cell size), such that the core is built up in certain regions. In fan containment applications, it is desirable to have the greatest thickness at the points on the case where the blade is likely to strike directly. This is typically, but not always, radially outward of the blade row.

In certain embodiments, interior components such as abradable or acoustic liners 32, 30 are used as winding mandrels. For certain embodiments, the wound core 20 is disposed on an acoustic liner 30. An acoustic liner typically comprises a sandwich structure including a foam or honeycomb core, which is covered on its radially inward surface by a layer of another material, typically a fiber-reinforced composite. The cover layer may contain holes to increase the noise attenuation of the structure. Methods for designing the acoustic liner sandwich construction to maximize the noise absorption of the structure are well known in the field. For other embodiments, the wound core 20 is disposed on an abradable liner 32. The abradable liner typically either comprises a monolithic abradable foam or other material or a sandwich construction with an interior cover. The interior of the sandwich would typically comprise a lightweight foam, such as Rohacell®, or a honeycomb material, such as Nomex® or aluminum honeycomb. Rohacell® is a polymethacrylimide- (PMI-) hard foam that is sold by Rohm, GmbH, Darmstadt, Germany. Nomex® is the registered brand name of a flame retardant meta-aramid material marketed by E. I. du Pont de Nemours and Company, Richmond Va. The interior cover is usually made from a fiber-reinforced composite material and is typically designed to withstand ice or other foreign object impacts that can occur on the interior of the case. For fan cases with load decoupling devices, there is typically a relatively large gap between the internal wall defining the engine air flow passage and the fan containment casing 10. For the illustrated embodiment shown in FIG. 7, the abradable liner 32 or acoustic liner 30 fills this gap. Beneficially, by winding the core 20 on the liner 30, 32, the composite core can be cured directly onto the liner, thereby avoiding a secondary bonding process.

Figure 7:
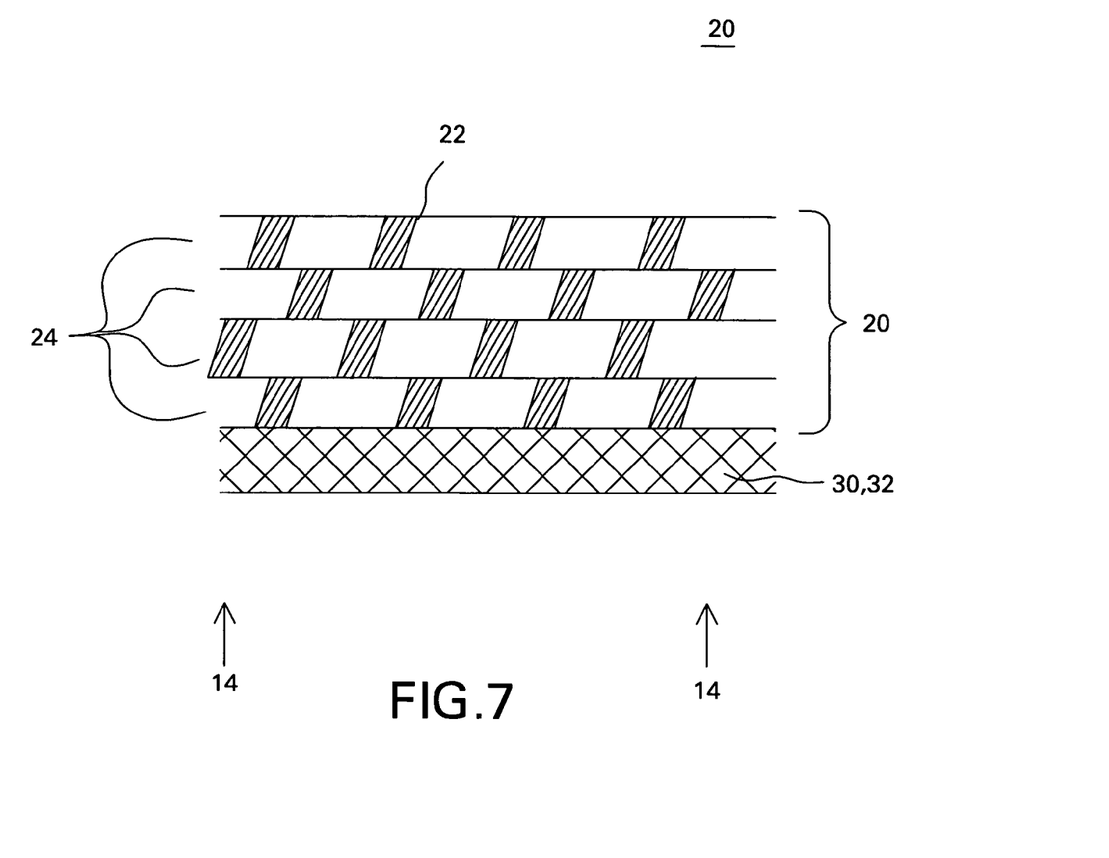
FIG. 7 schematically illustrates a cross-section of a portion of a filament-wound core formed on an acoustic or abradable liner.

A method embodiment of the invention is described with reference to FIGS. 7 and 8. As indicated, the method of forming a fan containment casing 10 includes winding a number of tows 22 on a liner 30, 32 to form a number of radially disposed layers 24. FIG. 7 depicts radially disposed layers wound on a liner 30, 32. During the winding process, each of the layers 24 is continuously connected to at least one adjacent one of the layers 24 across one of the end regions 14 via at least one of the tows 22. By "continuously connected" it is meant that the same tow(s) extends between adjacent layers. Typically, in the finished structure, the layers 24 will not be continuously connected with neighboring layers. Accordingly, the method further optionally includes the step of removing at least a portion of at least one of the ends regions 14 such that the layers are separated from adjacent ones of the layers at the end region, as indicated for example in FIG. 7. In this embodiment, the outer-most portion of the end region would typically be removed prior to cure. For example, the outer-most portion of the end regions may be removed by cutting with a blade or with an ultrasonic cutter for a high-speed precision cut. As noted above, example liners include acoustic and abradable liners 30, 32.

Figure 8:
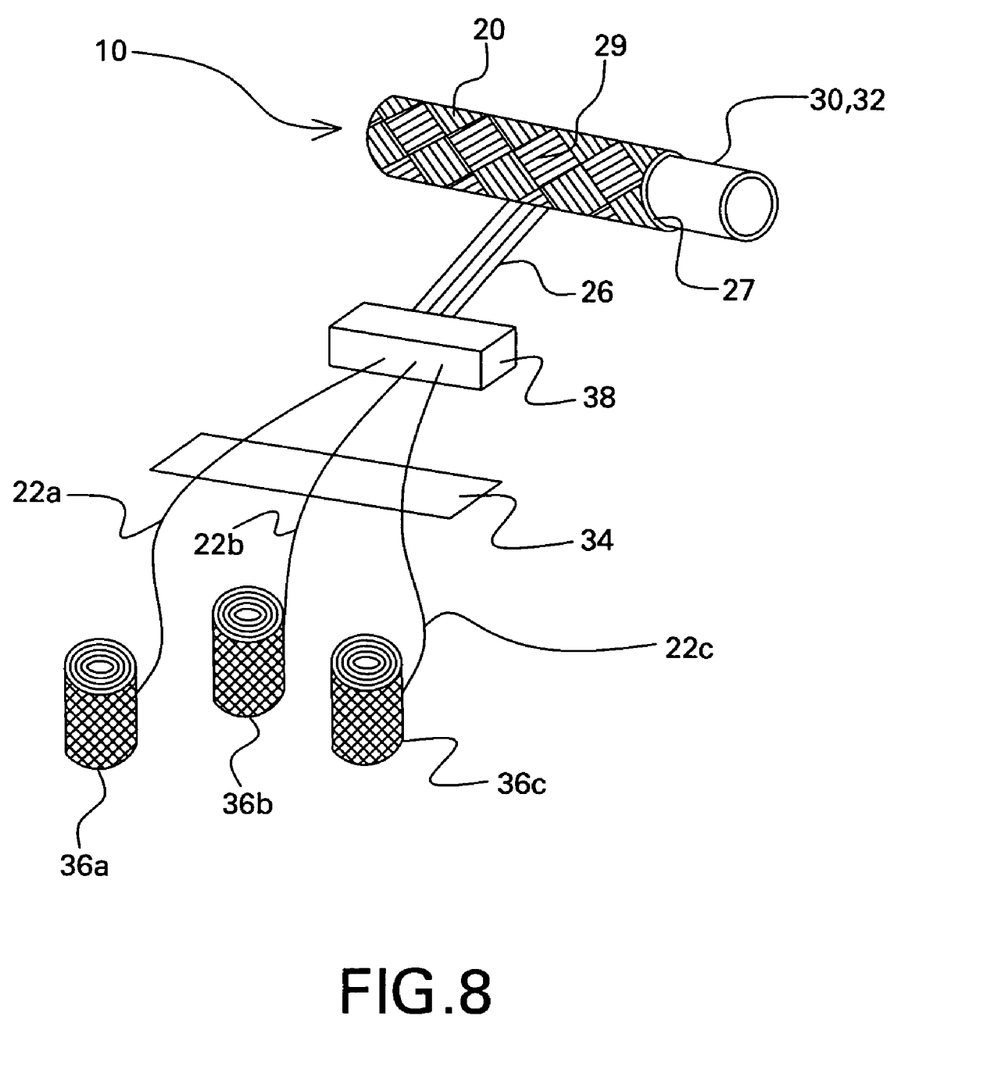
FIG. 8 schematically illustrates a filament winding method.

FIG. 8 illustrates a filament winding embodiment. As shown, multiple fibers 22a, 22b and 22c are brought together at junction 38 and then laid down as a band 26 in continuously connected layers 24 around liner 30, 32 to form wound core 20. The number of spools 36a, 36b, and 36c shown in FIG. 8 (namely 3 spools) is merely exemplary, and more or less spools may be used depending on the application. Depending on the application, the spools 36 may dispense the same or different fiber types, non-limiting examples of which include carbon (graphite) fibers and glass fibers, as discussed above.

It is desirable to bond the fibers together, for example using a thermosetting resin, non-limiting examples of which include thermosetting polymeric resins, such as vinyl ester resin, polyester resins, acrylic resins, epoxy resins, polyurethane resins, and mixtures thereof. This bonding may be accomplished in several ways. For example, tows 22 that are preimpregnated ("prepreg" tows) can be used. In other embodiments, the resin is applied during and/or after the winding process. For example, some or all of the tows 22 may be bonded together, for example by applying the resin to the coating in a bonding region 34 prior to laying the tows down. More particularly, the resin may be applied using a resin bath (not shown) or by spraying the resin onto the fibers prior to laying the fibers down. It should be noted that for many embodiments, only portions of the tows are coated with resin. In other embodiments, resin is applied to the tows after they are laid down (for example by spraying or drizzling) but during the wrapping process, for example to bond the layers 24 to one another. Application of the resin during the winding process has several benefits, including even distribution of the resin and ease of bonding the inner layers 24 of the core. However, in other embodiments, resin is at least partially infused into the layers 24 after the winding process is complete. In addition, an inner one of the layers 24 may be bonded to the liner 30, 32 for example by applying resin to the tows prior to laying down the first layer 24 on the liner, by applying resin to the liner 30, 32 prior to laying down the first layer 24 on the liner or by infusing the first layer with resin after it has been wound on the liner.

In certain embodiments, the thermosetting resin is cured at certain stages in the winding process. In other embodiments, the thermosetting resin is cured at the end of the winding process. The curing technique may vary depending on the type of resin used, but non-limiting examples of curing techniques include heating the resin, or exposing the resin to ultraviolet (UV) radiation. One common example of heating is accomplished by application of infrared (IR) radiation to the resin or by placement in an enclosed oven or autoclave. The resin chemistry will dictate the type of curing technique that can be used. One benefit of winding core 20 on liner 30, 32 is that the core can be cured directly onto the liner, thereby avoiding a secondary bonding process.

For the exemplary embodiment illustrated by FIG. 8, the winding step comprises grouping the tows 22 into a number of bands 26 and interleaving (or weaving) the bands 26 of tows 22 as a number of direct bands 27 and indirect bands 29 to form at least one winding pattern along at least a portion of one or more of the layers 24. For example, in FIG. 8, the tows 22 are grouped at junction 38. The width of the band can be adjusted by including more or less tows 22 in the band 26. In addition, the tightness of the winding pattern may be adjusted to vary the unit cell size for the winding pattern. For certain embodiments, the winding step includes wrapping (or taping) the bands 26 of tows 22 along at least a portion of one or more of the layers 24. FIG. 5 schematically depicts a layer 24 with bands 26 wound (or taped) in the end regions 14. As noted above, wrapping (or taping) the bands of tows enhances the strength of the core 20.

To form the exemplary core layer 24 shown in FIG. 5, the winding step includes wrapping the bands of tows 22 along the end regions 14 of the core within at least one of the layers and interleaving the bands of tows in the central region 12 of the core within at least one of the layers. As noted above, this arrangement provides enhanced containment in the central region of the core and enhanced strength in the end regions of the core.

There are many benefits of the above-described fan containment casings and methods of manufacture. Such benefits include impact resistance to large and small threats, added strength, and the overall ability to incorporate a variety of features, such as different materials, different tow thicknesses and different winding patterns into the casings. Other benefits include reduced casing weight, ease of manufacturing, and potential cost savings.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fan containment casing comprising a core comprising a plurality of tows, the core having a central region and two end regions, wherein the tows are grouped into a plurality of bands and form a plurality of filament-wound radially disposed layers, and wherein the bands of tows are interleaved as a plurality of direct bands and indirect bands along at least a portion of one or more of the layers to form at least one winding pattern having a unit cell size that varies for different ones of the regions.

2. The fan containment casing of claim 1, wherein the bands of tows are wrapped along at least a portion of one or more of the layers.

3. A fan containment casing comprising a core comprising a plurality of tows, the core having a central region and two end regions, wherein the tows are grouped into a plurality of bands and form a plurality of filament-wound radially disposed layers, wherein the bands of tows are interleaved as a plurality of direct bands and indirect bands along at least a portion of one or more of the layers, wherein the bands of tows are wrapped along at least a portion of one or more of the layers, wherein the bands of tows are wrapped along the end regions of the core within at least one of the layers, and wherein the bands of tows are interleaved in the central region of the core within at least one of the layers.

4. The fan containment casing of claim 1, wherein at least one of the tows comprises a first material and wherein at least one of the tows comprises a second material.

5. The fan containment casing of claim 4, wherein the second material comprises an electrically conductive material.

6. The fan containment casing of claim 4, wherein the first material is selected from the group consisting of carbon, glass, boron, ceramic, aromatic polyamid and silicon carbide.

7. The fan containment casing of claim 3, wherein at least one of the tows comprises a first material and wherein at least one of the tows comprises a second material, wherein at least one of the layers is formed using the tows comprising the first material, and wherein at least one other layer is formed using the tows comprising the second material.

8. The fan containment casing of claim 3, wherein at least one of the tows comprises a first material and wherein at least one of the tows comprises a second material, and wherein at least one of the layers comprises at least one tow comprising the first material and at least one tow comprising the second material.

9. The fan containment casing of claim 3, wherein at least one of the tows comprises a first material and wherein at least one of the tows comprises a second material, and wherein the tows comprising the first and second materials are interlaced to form at least one layer.

10. A fan containment casing comprising a core comprising a plurality of tows, the core having a central region and two end regions, wherein the tows are grouped into a plurality of bands and form a plurality of filament-wound radially disposed layers, wherein the bands of tows are interleaved as a plurality of direct bands and indirect bands along at least a portion of one or more of the layers, wherein at least one of the tows comprises a first material and wherein at least one of the tows comprises a second material, and wherein the tows comprising the first and second materials are wound on different regions of the core.

11. The fan containment casing of claim 1, wherein at least one of the bands has a first width, wherein at least another of the bands of tows has a second width, and wherein the first and the second widths are different.

12. The fan containment casing of claim 1, wherein the tows are wound such that a thickness of the fan containment casing varies as a function of spatial position along a z-axis.

13. The fan containment casing of claim 3, wherein the core is disposed on an acoustic liner.

14. The fan containment casing of claim 3, wherein the core is disposed on an abradable liner.

15. The fan containment casing of claim 3, wherein the core further comprises a resin that bonds the layers to one another.

16. A method of forming a fan containment casing, the method comprising:
    winding a plurality of tows on a liner to form a plurality of radially disposed layers, wherein each of the layers is continuously connected to at least one adjacent one of the layers across one of the end regions via at least one of the tows; and
    removing at least a portion of at least one of the ends regions such that the layers are separated from adjacent ones of the layers at the end region.

17. The method of claim 16, wherein the liner comprises an acoustic liner.

18. The method of claim 16, wherein the liner comprises an abradable material.

19. The method of claim 16, further comprising bonding at least one of:
    the tows to each other,
    the layers to one another, and
    an inner one of the layers to the liner,
    using a thermosetting resin.

20. A method of forming a fan containment casing, the method comprising:
    winding a plurality of tows on a liner to form a plurality of radially disposed layers, wherein each of the layers is continuously connected to at least one adjacent one of the layers across one of the end regions via at least one of the tows, wherein the winding step comprises:
    grouping the tows into a plurality of bands;
    interleaving the bands of tows as a plurality of direct bands and indirect bands along at least a portion of one or more of the layers to form at least one winding pattern;
    wrapping the bands of tows along the end regions of the core within at least one of the layers; and
    interleaving the bands of tows in the central region of the core within at least one of the layers.

21. A method of forming a fan containment casing, the method comprising:
    winding a plurality of tows on a liner to form a plurality of radially disposed layers, wherein each of the layers is continuously connected to at least one adjacent one of the layers across one of the end regions via at least one of the tows, wherein the winding step comprises:
    grouping the tows into a plurality of bands; and
    interleaving the bands of tows as a plurality of direct bands and indirect bands along at least a portion of one or more of the layers to form at least one winding pattern, the method further comprising adjusting a tightness of the winding pattern to vary a unit cell size for the winding pattern in different regions.

22. The method of claim 21, further comprising adjusting a width of at least one of the bands by adjusting a number of the tows within the band.

* * * * *